Figure 11:
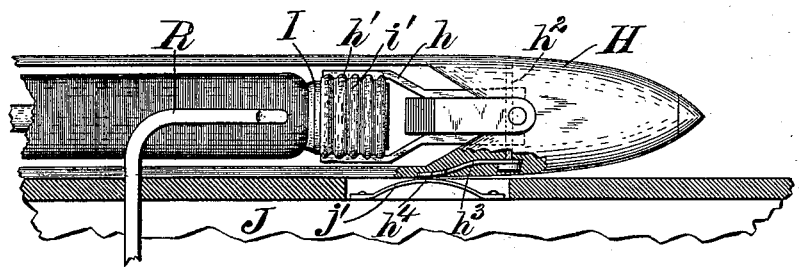

No. 674,632.　　　　　　　　　　　　　Patented May 21, 1901.
W. E. MOORE & F. R. CLARK.
WEFT REPLENISHING LOOM.
(Application filed Apr. 3, 1900.)
(No Model.)　　　　　　　　　　　　　5 Sheets—Sheet 1.
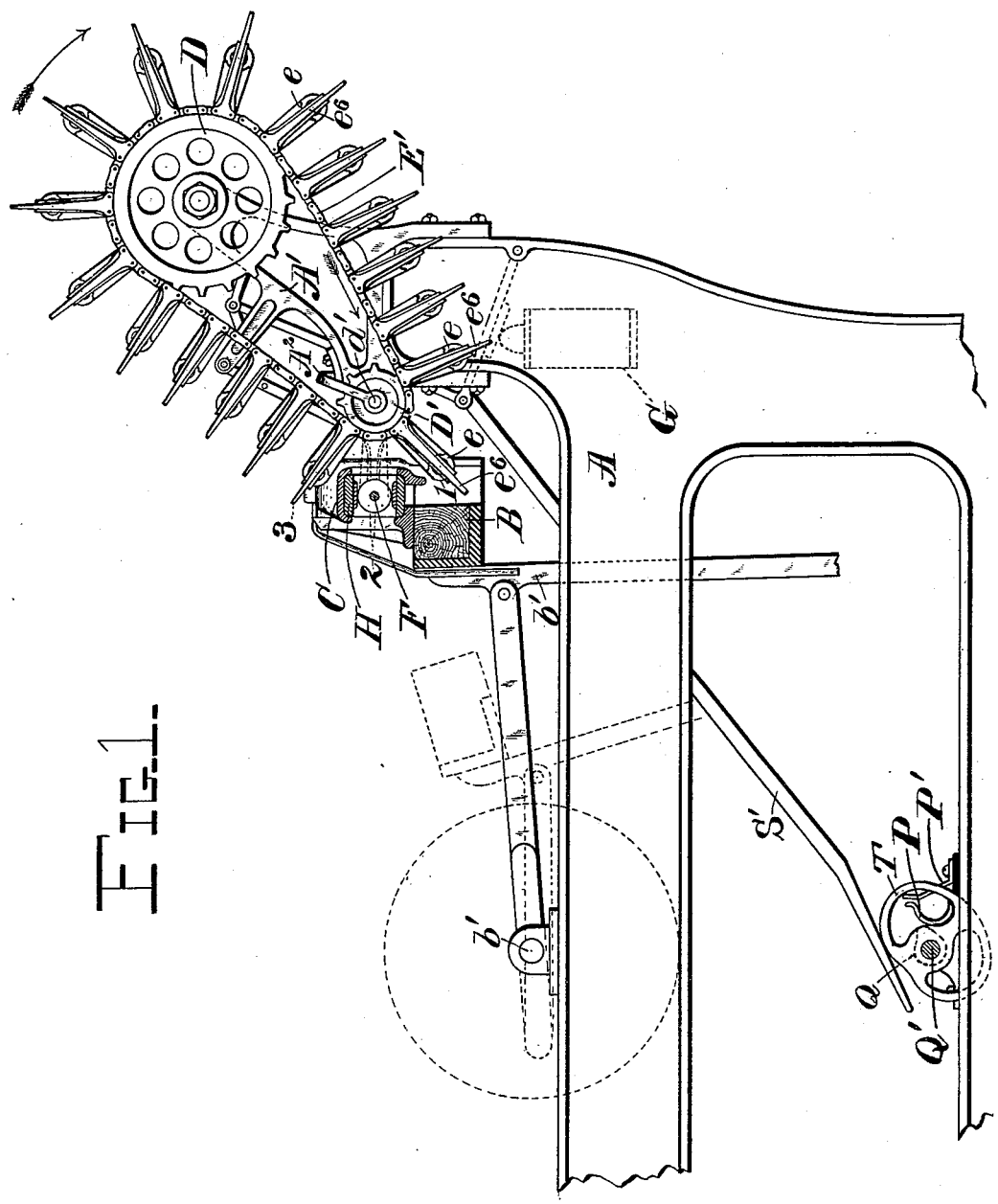
Witnesses
John H. Hall
J. Stephen Ginsta
Inventors
W. E. Moore
F. R. Clark
by Wilkinson & Fisher
Attorneys No. 674,632. Patented May 21, 1901.
W. E. MOORE & F. R. CLARK.
WEFT REPLENISHING LOOM.
(Application filed Apr. 3, 1900.)
(No Model.) 5 Sheets—Sheet 2.
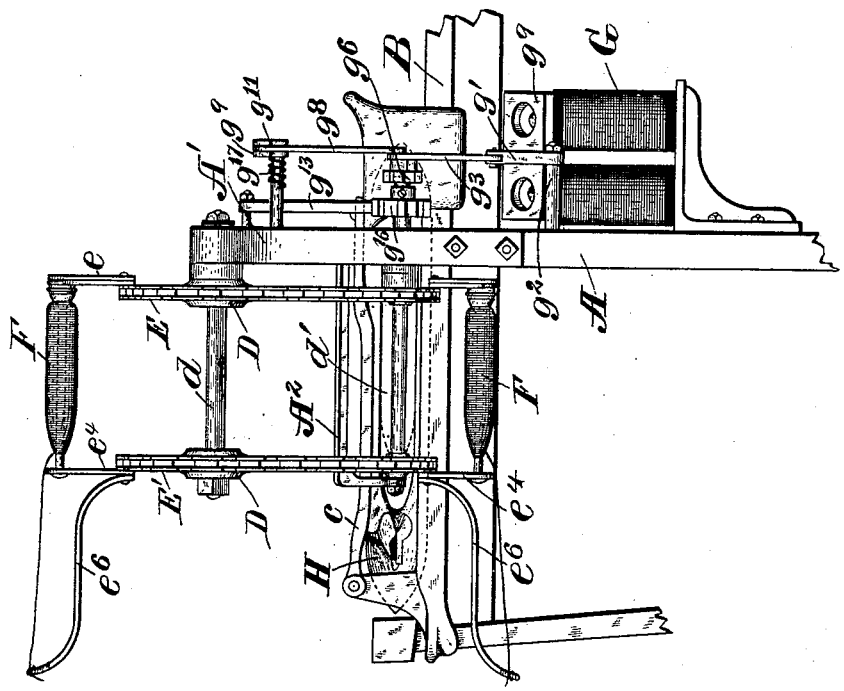
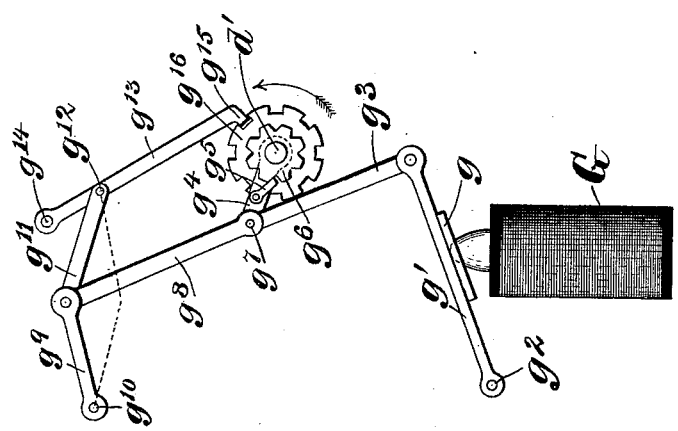
Witnesses
John H. Holt
J. Stephen Kinsta
Inventors
W. E. Moore.
F. R. Clark.
by Wilkinson & Fisher
Attorneys

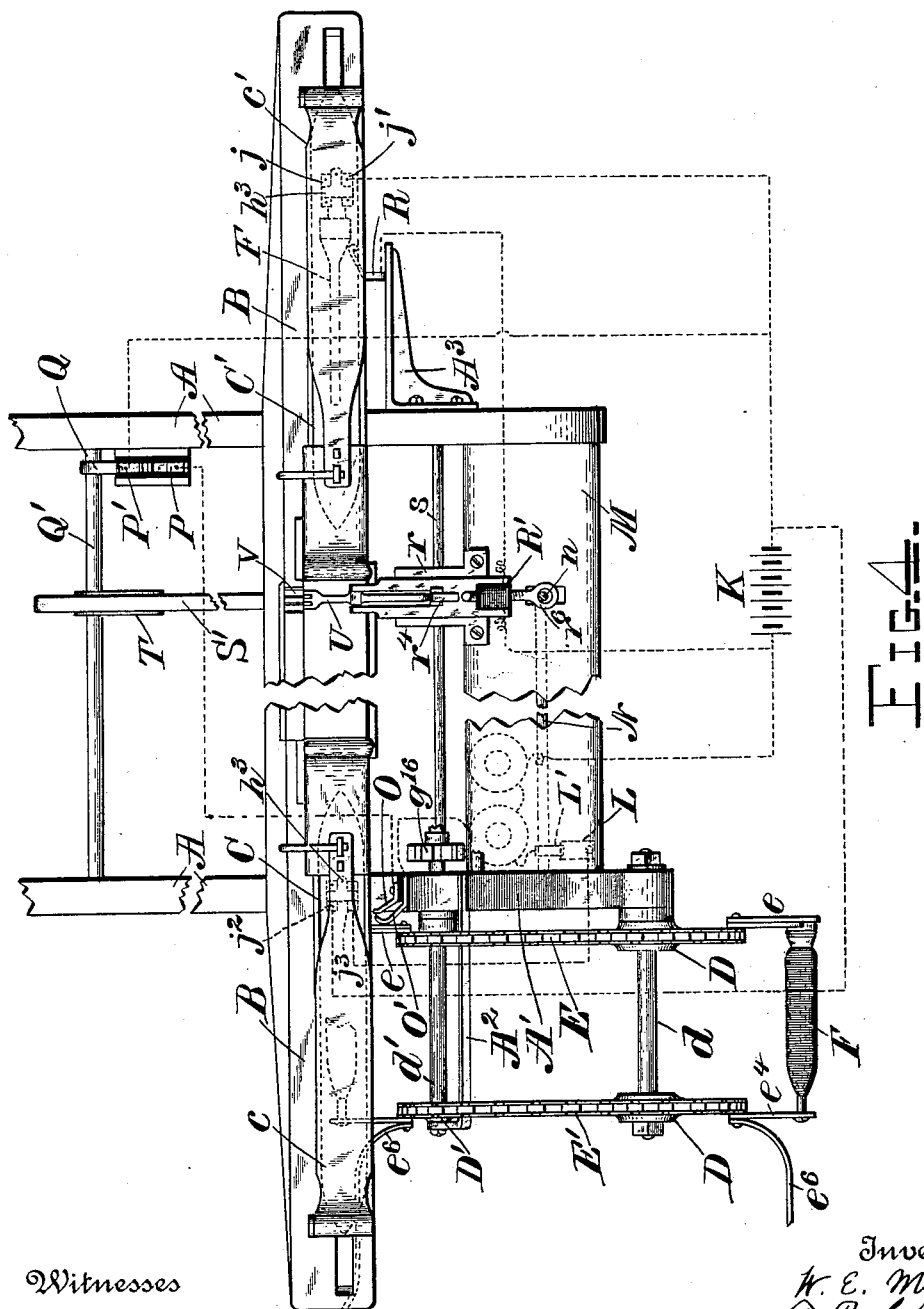

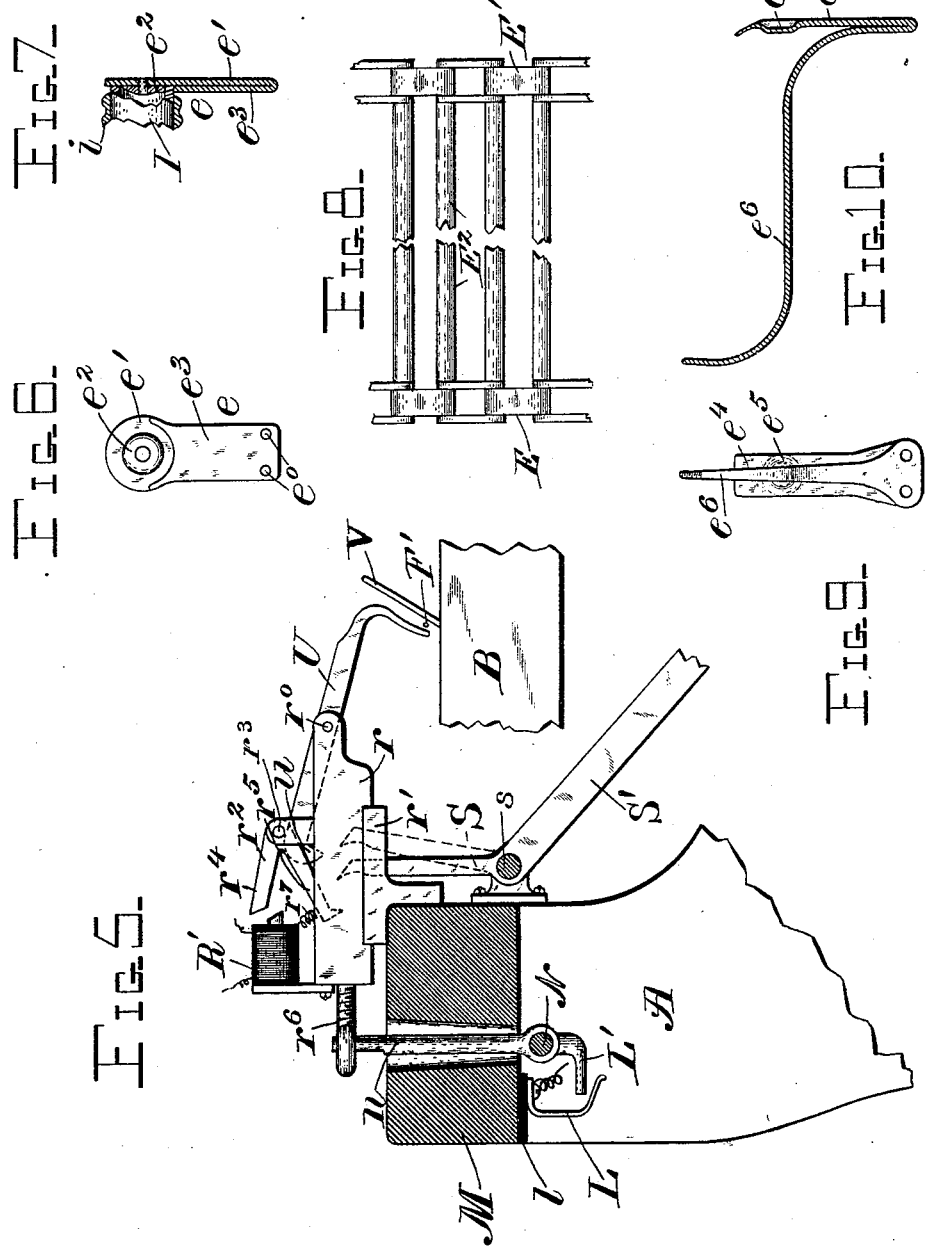

No. 674,632. Patented May 21, 1901.
W. E. MOORE & F. R. CLARK.
WEFT REPLENISHING LOOM.
(Application filed Apr. 3, 1900.)
(No Model.) 5 Sheets—Sheet 5.

Witnesses
John N. Holt
J. Stephen Gusta

Inventors
W. E. Moore
F. R. Clark
by Wilkinson & Fisher
Attorneys

THE NORRIS PETERS CO., PHOTO-LITHO., WASHINGTON, D. C.

UNITED STATES PATENT OFFICE.

WILLIAM E. MOORE AND FRANK R. CLARK, OF AUGUSTA, GEORGIA.

WEFT-REPLENISHING LOOM.

SPECIFICATION forming part of Letters Patent No. 674,632, dated May 21, 1901.

Application filed April 3, 1900. Serial No. 11,315. (No model.)

*To all whom it may concern:*

Be it known that we, WILLIAM E. MOORE and FRANK R. CLARK, citizens of the United States, residing at Augusta, in the county of Richmond and State of Georgia, have invented certain new and useful Improvements in Weft-Replenishing Looms; and we do hereby declare the following to be a full, clear, and exact description of the invention, such as will enable others skilled in the art to which it appertains to make and use the same.

Our invention relates to improvements in looms, and especially to that class of looms in which the bobbins are automatically supplied to the shuttle when the weft or filling is exhausted or broken. It has generally been the custom in making looms of this character to provide a magazine which carries a plurality of filled bobbins and discharges the bobbins into the shuttle at the forward beat of the lay by means of a pusher operated generally by complicated mechanism and acting to push the bobbins out of the magazine into the top of the shuttle-box from above the lay. Such a construction is open to objections, the principal ones being that the bobbins cannot be so rapidly changed as with our invention (hence the loom cannot be run so rapidly) and that it necessitates the employment of extra-complicated mechanism for driving the bobbins from the magazine into the shuttle in the way stated.

One of the objects of this invention, therefore, is to overcome this objection, and this we do by feeding the bobbins into the shuttle from the side instead of from the top of the shuttle or shuttle-box. In doing this we accomplish the same result that is accomplished by the so-called "pusher" by making the lay itself act as the pusher.

According to our invention a magazine carrying the filled bobbins is secured to the loom-frame in such a way as to automatically bring the bobbins successively into the proper position to be fed into the shuttle whenever the bobbin in use becomes empty or the weft-thread or filling becomes broken. The position into which the bobbin to be fed into the shuttle is brought by the magazine is the same that the bobbin would occupy upon the extreme forward beat of the lay were the bobbin already in the shuttle, so that as the bobbins are caused to occupy this position the lay upon its forward stroke drives the shuttle into engagement with the new bobbin, which pushes the old bobbin out of the shuttle and takes its place. The shuttle-springs which engage the bobbin when the lay beats up, holding the bobbin much tighter than its fastening in the magazine, will cause the new bobbin to be released from the magazine as the lay starts on its backward stroke. The mechanism by which the bobbins are thus brought successively into the feeding position is electromechanically operated and acts only at such times as the shuttle is in the proper position to receive the bobbin. This we accomplish by a misplaced-shuttle detector comprising two metallic contacts placed in the shuttle-box into which the bobbins are fed, said contacts forming a part of the electric circuit which operates the feeding mechanism. The shuttle also carries a metallic contact-piece so located that it will complete the electric circuit through both shuttle-box contacts at such times only as the shuttle is in the proper position to receive the bobbin. There is therefore a positive controlling means which prevents the bobbins from being placed in the feeding positions except at such times as they should be there.

Another important feature of our invention is the empty-bobbin detector, which operates independently of the filling-fork and which comprises a series of electric contacts whereby the electric circuit which operates the bobbin-feeding mechanism is completed when the filling becomes nearly exhausted. As the electrical empty-bobbin detector herein described acts just before the filling is entirely exhausted, it prevents the liability of a weft-thread being left out as each bobbin becomes empty, as is apt to happen with the looms of this class at present employed. This feature of our invention is made the subject of a divisional application filed by us July 17, 1900, and serially numbered 25,029, where the said feature is fully described and claimed.

Our invention furthermore comprises electrical means operated in connection with the filling-fork mechanism whereby the bobbin-feed mechanism is operated at the proper time upon the breaking of the filling so as to cause the replacing of the broken filling by a bobbin with fresh filling. This is all accomplished by a simple system of electrical contacts, which renders unnecessary the use of much machinery at present employed.

Our invention is readily adaptable to any of the forms of common loom in general use and is by no means confined to any particular one, it being one of the principal features of our invention that any of the well-known forms of common loom may be converted into an automatic self-filling loom simply by the addition of our self-filling attachment and accessories.

The above, as well as other features of our present invention, will be hereinafter more particularly described and claimed.

Figure 12:
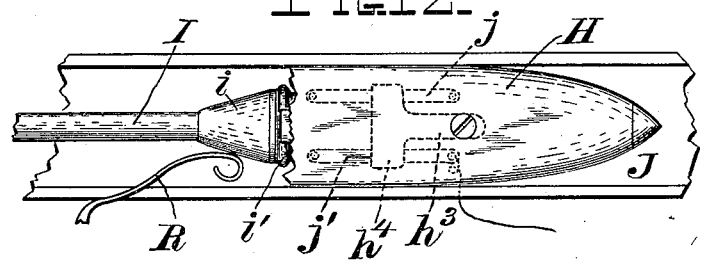
Figure 13:
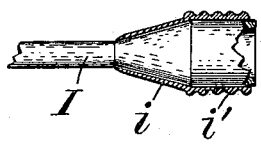
Figure 14:
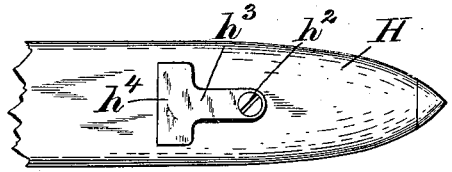
Figure 15:
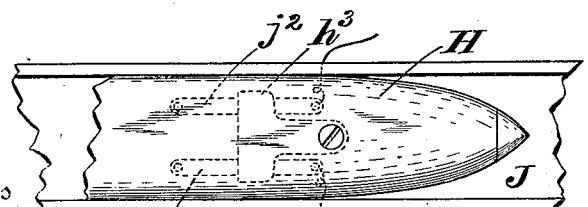

Referring to the drawings, which illustrate our invention, Figure 1 represents in end elevation and partly in section a loom with our invention attached thereto, only so much of the loom being shown as is necessary to illustrate the principle of the invention. Fig. 2 represents in elevation, slightly enlarged, the detent mechanism for operating the bobbin-feed magazine. Fig. 3 represents a fragmentary side elevation of a loom provided with our invention, portions being omitted for the sake of clearness in the drawings. Fig. 4 represents a top plan view of the said loom and attachments, showing the electric circuit in diagram. Fig. 5 represents an enlarged detail view of the electrically-operated filling-fork mechanism. Fig. 6 represents an enlarged detail view, in front elevation, of one of the retainers for holding the head of the bobbin in the magazine; and Fig. 7 represents a vertical central section of the same. Fig. 8 represents an enlarged fragmentary elevation of the sprocket-chains of the magazine and rods connecting them together. Fig. 9 represents in enlarged side elevation one of the retainers for engaging the toe of the bobbin and provided with a thread-end holder, and Fig. 10 represents a vertical central section of the same. Fig. 11 represents an enlarged detail view, partly in elevation and partly in section, of one end of a shuttle and bobbin carried thereby, showing the system of electrical contacts by which the empty bobbin is detected. Fig. 12 represents a top plan view of the same. Fig. 13 represents the head of a bobbin in elevation provided with a metallic ferrule, which is shown in section. Fig. 14 represents a plan view of the bottom of one end of the shuttle, showing the metallic contact-maker carried thereby; and Fig. 15 represents a top plan view of one end of the shuttle and shuttle-box, showing in dotted lines the position of the electrical contact-pieces employed in completing the circuit to the electromagnetic-magazine mechanism at such times only as the shuttle is in the proper position to receive a new bobbin.

Similar characters refer to similar parts throughout the several views.

A represents the frame of a loom of any approved form, B the lay, and C C' the shuttle-boxes, having the usual shuttle-binders $c$ $c'$. The lay B, carried by the swords $b$, is rocked in the usual manner from the crank-shaft $b'$. The bobbin-magazine feed mechanism is mounted upon a frame A'; secured to one of the loom end frames, as shown, and comprises, among other parts, two sprocket-wheels D, mounted to rotate upon a shaft $d$, which is secured fast to the frame A'. A second shaft, $d'$, is rotatably mounted in the lower portion of the frame A' and carries two sprocket-wheels D', the outer end of the shaft $d'$ being journaled in a supporting-frame A², secured to the frame A', as shown, or cast integral therewith, as preferred. The wheels D and D' are geared together by sprocket-chains E E'. In order to insure greater rigidity, these chains may be connected by rods E², as shown in Fig. 8. To every alternate outer link of the chain E is secured a bobbin-retainer $e$, which is adapted to hold the head of the bobbin, and consists of a metallic plate bent once upon itself, (see Figs. 6 and 7,) one of the members $e'$ being adapted to engage the end of the bobbin, and is provided with the button-shaped lug $e^2$, which fits into the hollow end of the bobbin, while the member $e^3$ is concave at its upper end, engaging the side of the head of the bobbin, the purpose of which is to prevent the bobbin from being pushed out in the wrong direction by the shuttle when the change of bobbins is taking place, as will hereinafter more fully appear. The retainers $e$ are provided with screw-holes $e^0$ for attaching them to the chains. The corresponding alternate outer links of the chain E' carry the combined retainers and thread-end holders which hold the other ends of the bobbins and which consist of a metallic strip $e^4$, provided near its upper end with a cavity $e^5$, into which the end of the bobbin fits. (See Figs. 9 and 10.) The lower end of the strip is bent upward upon itself and then outward and upward, forming an arm $e^6$, which constitutes the thread-end holder to which the thread or filling E' is secured. Between each pair of these retainers is carried a filled bobbin F, as shown in Fig. 3, where two bobbins are shown in the magazine, the rest being omitted for the sake of clearness in the drawings. The other bobbin-holders are also omitted from Figs. 3 and 4 for the same reason.

The bobbins in the magazine are brought successively into the feeding position and held there for the proper length of time by the electromagnetically-operated ratchet-and-detent mechanism shown most clearly in Figs. 2 and 3. This mechanism comprises, among other parts, the electromagnet G, secured to the frame of the loom, as shown, and having an armature $g$, secured to an arm $g'$, which is pivoted at one end to the loom-frame, as at $g^2$. The other end of the arm $g'$ is pivoted to a rod $g^3$, which is in turn pivoted at its upper end to an arm $g^4$, loosely secured at one end to the shaft $d'$. This arm $g^4$ carries a pawl $g^5$, which engages a ratchet-wheel $g^6$, mounted fast on the shaft $d'$. The arm $g^4$ and rod $g^3$ are pivoted, as at $g^7$, to a rod or link $g^8$. An arm $g^9$ is pivoted, as at $g^{10}$, to the frame $A'$, and at its other end to the upper end of the rod $g^8$, where it is also pivoted to an arm $g^{11}$. The arm $g^{11}$ is pivoted at its other end, as at $g^{12}$, to a detent-lever $g^{13}$, which is pivoted at its upper end, as at $g^{14}$, to the frame $A'$. The lower end of the detent-lever is provided with a lug $d^{15}$, which engages the teeth of a detent-wheel $g^{16}$, mounted fast on the shaft $d'$. The arms or members $g^9$ and $g^{11}$ form a toggle-joint, which is normally held in the position shown in Fig. 2 by a spring $g^{17}$.

H represents a self-threading shuttle having the bobbin-retaining springs $h$, provided with the transverse grooves $h'$, which are adapted to engage the rolled threads or beads on the head of the bobbin I, as hereinafter more fully described.

Secured to the bolt $h^2$, which holds the springs $h$, and countersunk into the shuttle is a metallic contact-plate $h^3$, the portion $h^4$ of which is flush with the face of the shuttle, so that it will be seen that there is a continuous electrical connection from the plate $h^3$ through the bolt $h^2$ and springs $h$ to the head of the bobbin, which is provided with a metallic ferrule $i$, having the formed threads or beads $i'$.

Countersunk in the race-iron J are two metallic contact-springs $j\,j'$, placed beside each other, while in the race-iron at the other end of the lay are similarly mounted the metallic contact-springs $j^2\,j^3$. These contact-springs normally extend slightly above the surface of the race-iron, so that when the shuttle has reached the extremity of its travel in either direction the plate $h^3$, carried by the shuttle, will make contact with the springs $j\,j'$ or $j^2\,j^3$, dependent upon which end of the lay the shuttle is at that time. The contact-spring $j^2$ is electrically connected to one of the poles of a battery or other source of electricity K, while the other spring, $j^3$, is electrically connected to the insulated metallic contact-spring L, mounted on the breast-beam M of the loom. (See Fig. 5.) The spring-contact L is adapted to make contact at certain times, hereinafter described, with a metallic contact-piece $L'$, carried by the shaft N. The contact-piece $L'$ is electrically connected with the electromagnet G, which is in turn connected to the source of electricity or battery K, (see Fig. 4,) where the electric circuits are indicated by dotted lines. A second electric circuit passes from the battery K through the coils of the electromagnet G, and thence to an insulated metallic contact-spring O and through a second insulated contact-spring, $O'$, mounted close to the spring O, and then to an insulated metallic contact-spring P, and mounted near the spring P is an insulated metallic contact-spring $P'$, which is electrically connected to the battery K. The electric circuit is completed through the springs P and $P'$ at the proper time by the boss Q, mounted on the shaft $Q'$, which boss engages the spring $P'$ and causes it to make contact with the spring P while the circuit is completed through the contact-springs O and $O'$ by the bobbin-retainers $e$, which as they come into the feeding position strike the spring O and cause it to contact with the spring $O'$.

The means for detecting an almost-empty bobbin and operating the magazine so as to supply a filled bobbin to the shuttle after the filling has become nearly exhausted comprises, among other parts, a feeler R, which consists of a metallic spring located at the right-hand end of the loom and secured fast to the frame $A^3$ or otherwise to the frame of the loom. The feeler extends into the shuttle-box $C'$ and is so located that when the shuttle reaches the position shown in dotted lines on the right in Fig. 4 the feeler will rest upon the filling or thread of the shuttle and will continue to rest thereon at each time that the shuttle reaches that end of its travel until the filling becomes exhausted, when the feeler will be brought into contact with the metallic ferrule on the head of the bobbin. The electric connection will then be established from the feeler through the ferrule, the retaining-springs of the shuttle, contact-plate $h^3$ on the bottom of the shuttle, to the contact-spring $j'$, which latter is electrically connected to the battery K. The feeler R is preferably insulated from the loom-frame, but is electrically connected to the coil of an electromagnet $R'$, which is in turn connected with the battery K. The electromagnet is mounted fast upon the filling-fork slide $r$, which is mounted to slide in the usual manner in the bracket $r'$, secured to the breast-beam M. A bell-crank lever $r^2$ is pivoted at $r^3$ to the slide $r$. The arm $r^4$ of this lever forms an armature for said electromagnet, while the depending arm $r^5$ acts as a dog which when the magnet $R'$ attracts the armature $r^4$ will engage the filling-fork hammer S, which is formed upon the end of the lever $S'$, pivoted upon the shaft $s$, all of which is most clearly shown in Fig. 5. The depending arm $r^5$ of the lever $r^2$ is normally held up out of the path of the hammer S by the spring $r^7$. The lever $S'$ rests upon a cam T, carried by the shaft $Q'$, by means of which cam the desired rocking motion is imparted to the filling-fork hammer S, as is well understood in the art. An eye $r^6$, secured to the back of the slide $r$, engages the upper end of an arm $n$, which extends through the breast-beam from the shaft N, to which it is rigidly secured. The filling-fork U is pivoted in the slide $r$, as at $r^0$, in front of the comb V.

Assuming the magazine to be filled with fresh or filled bobbins, the operation of our invention is as follows: When the filling on the bobbin in the shuttle has become exhausted, or nearly so, the feeler R will make contact with the metallic head of the bobbin when the shuttle has reached its right-hand position. This will complete the electric circuit through the contacts $j'$ and $h^3$ to the battery, and from there through the electromagnet R'. When this takes place, the magnet R' will attract its armature $r^4$ and throw the arm $r^5$ (see Fig. 5) in the path of the filling-fork hammer S, which upon its backward stroke will engage the catch or arm $r^5$ and move the filling-fork slide $r$ with it. This will rock the arm $n$ and cause the contact-maker L' to engage the contact L, which will partly complete the circuit from the battery through the coils of the magnets G; but this circuit will not be entirely completed until the shuttle reaches the shuttle-box C and is in the proper position there to receive the new bobbin. When it has reached that position, the contact-plate $h^3$ carried by it will complete the electric circuit across the springs $j^2$ and $j^3$. The magnet G will then become energized and draw down its armature. The effect of this will be to cause the pawl $g^5$ to rotate the ratchet-wheel $g^6$ one-eighth of its revolution—that is, to a sufficient extent to bring the fresh bobbin at position 1, Fig. 1, into position 2, where the retainer is shown in dotted lines. As the ratchet rotates this distance, the detent-lever $g^{13}$ rises out of the detent-wheel, but returns to it when the wheel has rotated the proper distance and engages it between its teeth, preventing it from rotating farther until the magnet is acted on. This motion of the detent-lever is obtained by the use of the toggle-joint at $g^9$ $g^{11}$, as will be readily understood. When this has taken place and the fresh-filled bobbin is in position 2, Fig. 1, the lay will beat up and drive the shuttle into engagement with the bobbin, forcing the shuttle-springs over the bobbin-head and ejecting the empty bobbin, which will be pushed out by the filled one. The lay then beats back, taking the filled bobbin with it, as the friction of the bobbin springs against the bobbin-head is greater than the friction between the bobbin-retainers of the magazine and the bobbin. When the bobbin has thus been fed to the shuttle, the retainers which carried it cannot, however, remain in position 2, but must be carried into position 3 just as soon as the change has been made and before the lay reaches the end of its next forward beat. This is accomplished by causing each bobbin-retainer $e$ of the magazine as it comes into position 2 to engage a contact-spring O, which will thereby be brought into contact with the spring O', which will partly complete an electric circuit from the battery through the magnet G. The electric circuit is then entirely completed by the boss Q on the shaft Q' bringing the contact-spring P into engagement with the spring P'. The magnets G thus become energized and operate the ratchet-and-detent mechanism, as before described, and send the empty-bobbin retainers into position 3. Exactly the same operation is repeated for all of the succeeding filled bobbins—that is, when the filling of the one in use becomes exhausted.

The operation when the filling becomes broken is as follows: When the filling is broken, the end $u$ of the filling-fork, as is well understood in the art, will not be lifted from the path of the filling-fork hammer S, but will be engaged by it and push the slide $r$ back, operating the arm $n$ and making electrical connection between the contacts L and L'. This will partly complete the circuit through the magnet G, which will be completed when the shuttle arrives at that position in the box C where its contact $h^3$ will be brought into engagement with the contact-springs $j^2$ and $j^3$. This will energize the magnet G and cause a new-filled bobbin of the magazine to be brought from position 1 to position 2 and fed to the shuttle, as hereinbefore described. The bobbin-retainers are then passed on to position 3, just as before described, by the completion of the circuit of the magnet G through the contacts O O' and P P'.

Having thus described our invention, we do not wish to be understood as confining ourselves to the specific forms and details shown and described, as many changes may be made therein without departing from the spirit of the invention. For example, we do not confine ourselves to the use of a magazine comprising bobbin-retainers mounted upon sprocket-chains, as we may use any suitable means for holding the bobbins and supplying them to the shuttle so long as this means is adapted to make use of the force of the lay in accomplishing the change of bobbins, which obviates the use of the present so-called "pusher." Moreover, the ratchet-and-detent mechanism may be replaced by other mechanism which will accomplish the same result, if found more convenient, without departing from the spirit of the invention. It is also obvious that changes may be made in the electrical contacts, all without departing from the spirit of our invention; but

What we do claim, and desire to secure by Letters Patent of the United States, is—

1. A loom, having a lay and shuttle carried thereby, a bobbin-magazine, bobbins carried by said magazine, and means for transferring said bobbins from said magazine to said shuttle by the frictional engagement of said shuttle with said bobbins, substantially as described.

2. In a loom, the combination with the lay and shuttle carried thereby, of a bobbin-magazine, bobbins carried by said magazine, means for operating said magazine whereby the shuttle is driven into engagement with said bobbins by the force of said lay, transferring said bobbins from said magazine to said shuttle, substantially as described.

3. A loom having a lay, a shuttle, a bobbin-magazine and bobbins carried thereby, means for operating said magazine whereby the shuttle is driven by the lay into engagement with a bobbin while the said bobbin is held by the magazine, the said bobbin being thus transferred from said magazine to said shuttle, substantially as described.

4. A loom having a lay, a shuttle, a rotatable bobbin-magazine and bobbins carried thereby, means for operating said magazine whereby the shuttle is driven by the lay into engagement with a bobbin while the said bobbin is held by the magazine, the said bobbin being thus transferred from said magazine to said shuttle, substantially as described.

5. A loom having a lay, a shuttle-box, a shuttle open at both sides for the entrance and exit of a bobbin, a bobbin-magazine and bobbins carried thereby, means for operating said magazine whereby the shuttle is driven by the lay into engagement with a bobbin while the said bobbin is held by the magazine, the said bobbin being thus transferred from said magazine to said shuttle, and simultaneously ejecting the empty bobbin from the shuttle, substantially as described.

6. A loom having a lay, a shuttle, a bobbin-magazine adapted to engage the heads and tips of a series of bobbins, bobbins carried by said magazine, means for operating said magazine whereby the shuttle is driven by the lay into engagement with a bobbin while the said bobbin is held by the magazine, the said bobbin being thus transferred from said magazine to said shuttle, substantially as described.

7. A loom having a lay, a shuttle, a movable bobbin-magazine adapted to engage the heads and tips of a series of bobbins, bobbins carried by said magazine, means for operating said magazine whereby the shuttle is driven by the lay into engagement with a bobbin while the said bobbin is held by the magazine, the said bobbin being thus transferred from said magazine to said shuttle, substantially as described.

8. A loom having a lay, a shuttle, a bobbin-magazine adapted to engage the heads of a series of bobbins, bobbins carried by said magazine, means for operating said magazine whereby the shuttle is driven by the lay into engagement with a bobbin while the said bobbin is held by the magazine, the said bobbin being thus transferred from said magazine to said shuttle, substantially as described.

9. A loom having a lay, a shuttle, a movable bobbin-magazine and bobbins carried thereby, electromagnetic means for operating said magazine whereby the shuttle is driven by the lay into engagement with a bobbin while the said bobbin is held by the magazine, the said bobbin being thus transferred from said magazine to said shuttle, substantially as described.

10. A loom having a lay and shuttle carried thereby, a bobbin-magazine, bobbins carried thereby, and electromagnetically-operated means for operating said magazine whereby the bobbins are transferred therefrom into said shuttle successively, substantially as described.

11. A loom having a lay and shuttle carried thereby, a rotatable bobbin-magazine, bobbins carried thereby, and electromagnetically-operated means for operating said magazine whereby the bobbins are transferred therefrom into said shuttle successively, substantially as described.

12. A loom having a lay, a shuttle, a bobbin-magazine provided with a series of bobbin-retainers, bobbins carried by said retainers, means for operating said magazine to bring said bobbins successively into the feeding position whereby the shuttle is driven by the lay into engagement with a bobbin while the bobbin is held by the retainers in the magazine, the said bobbins being thus fed from said magazine into said shuttle, and means for shifting the empty retainers clear of the shuttle after the change has taken place, substantially as described.

13. A loom having a lay, a shuttle, a bobbin-magazine, bobbins carried by said magazine, means for operating said magazine to bring said bobbins successively into the feeding position whereby the shuttle is driven by the lay into engagement with a bobbin while the bobbin is held in the magazine, the said bobbins being thus fed from said magazine into said shuttle, and means for preventing the operation of feeding except at such times only as the shuttle is in the proper position to receive a bobbin, substantially as described.

14. A loom having a lay, a shuttle, a bobbin-magazine, bobbins carried by said magazine, means for operating said magazine to bring said bobbins successively into the feeding position whereby the shuttle is driven by the lay into engagement with a bobbin while the bobbin is held in the magazine, and means operated by the shuttle for preventing the operation of feeding except at such times only as the shuttle is in the proper position to receive a bobbin, substantially as described.

15. A loom having a lay, a shuttle, a bobbin-magazine, bobbins carried by said magazine, means for operating said magazine to bring said bobbins successively into the feeding position whereby the shuttle is driven by the lay into engagement with a bobbin while the bobbin is held in the magazine, the said bobbins being thus fed from said magazine into said shuttle, electrical contacts completed by the shuttle at such times only as the shuttle is in the proper position to receive a bobbin and preventing the operation of the magazine when the shuttle is misplaced, substantially as described.

16. A loom having a lay, a shuttle, a rotatable bobbin-magazine provided with a series of bobbin-retainers, bobbins carried by said retainers, means for operating said magazine, to bring said bobbins successively into the feeding position whereby the shuttle is driven by the lay into engagement with a bobbin while the bobbin is held by the retainers in the magazine, the said bobbins being thus fed from said magazine into said shuttle, means for preventing the magazine from operating upon a misplaced shuttle, and means for shifting the empty retainers clear of the shuttle after the change has taken place, substantially as described.

17. A loom having a lay, a self-threading shuttle, a bobbin-magazine provided with a series of bobbin-retainers and weft or thread end holders secured to said retainers, bobbins carried by said retainers, means for operating said magazine to bring said bobbins successively into the feeding position whereby the shuttle is driven by the lay into engagement with a bobbin while the bobbin is held by the retainers in the magazine, the said bobbins being thus fed from said magazine into said shuttle, and means for shifting the empty retainers clear of the shuttle after the change has taken place, substantially as described.

18. A loom having a lay, a shuttle, a rotatable bobbin-magazine provided with a series of bobbin-retainers, bobbins carried by said retainers, means for operating said magazine to bring said bobbins successively into the feeding position whereby the shuttle is driven by the lay into engagement with a bobbin while the bobbin is held by the retainers in the magazine, the said bobbins being thus fed from said magazine into said shuttle, means for holding said retainers against backward or forward movement during the feeding operation, and means for shifting the empty retainers clear of the shuttle after the change has taken place, substantially as described.

19. In a loom, a rotatable bobbin-magazine for automatically supplying bobbins to the shuttle, bobbins carried by said magazine, ratchet-and-pawl mechanism for rotating said magazine and bringing the bobbins thereof into the feeding position, detent mechanism for holding said magazine against backward or forward rotation when the magazine should remain stationary, electromagnets operating said ratchet-and-pawl and detent mechanisms, an electric circuit passing through the coils of said magnet and means for automatically completing the said electric circuit when the filling upon the bobbin in the shuttle has become partly exhausted whereby a filled bobbin will be supplied and the empty one ejected from said shuttle, substantially as described.

20. A loom having a lay, a shuttle open at its sides for the reception of the bobbin, a movable bobbin-magazine, bobbins carried by said magazine, an electromagnet and means for energizing the same, a ratchet-and-pawl mechanism operating said magazine, and operative connection between said ratchet-and-pawl mechanism and said magnet, substantially as described.

21. A loom having a lay, a shuttle-box and shuttle open at its sides for the entrance and exit of a bobbin, a rotatable bobbin-magazine and bobbins carried thereby, means for rotating said magazine whereby said bobbins are brought successively into the path of said shuttle, the said bobbin being transferred to said shuttle by the frictional contact between the two and simultaneously ejecting the empty bobbin from said shuttle, substantially as described.

22. In a loom, the combination with the lay and shuttle carried thereby, of a bobbin-magazine, bobbins carried by said magazine, electromagnetically-operated means for operating said magazine whereby said bobbins are transferred therefrom into said shuttle successively, and a series of electrical contacts adapted to render said electromagnetic means operative at such times only as the shuttle is in the proper position to receive a bobbin, substantially as described.

23. In a loom, the combination with the lay and a self-threading shuttle carried thereby, of a bobbin-magazine, bobbins carried by said magazine, electromagnetically-operated means for operating said magazine whereby said bobbins are transferred therefrom into said shuttle successively, and a series of electrical contacts electrically connected to the electromagnet and having the circuit completed through them by means of said shuttle at such times only as the shuttle is in the proper position to receive a bobbin, substantially as described.

24. In a loom, the combination with the lay and shuttle carried thereby, having an electrical-contact maker, of a bobbin-magazine, bobbins carried by said magazine, electromagnetically-operated means for operating said magazine whereby said bobbins are transferred therefrom into said shuttle successively, an electric circuit passing through the coils of the electromagnets, a series of electrical contacts connected to said circuit and located in the path of said shuttle whereby the said circuit is completed to said magnets by the contact-maker of said shuttle at such times only as the shuttle is in the proper position to receive a bobbin, substantially as described.

25. In a loom, the combination with the lay and shuttle carried thereby, of a movable bobbin-magazine adapted to automatically feed the bobbins to the shuttle, bobbins carried by said magazine, electromagnetically-operated means for operating said magazine whereby said bobbins are transferred therefrom into said shuttle successively, and a series of electrical contacts adapted to render said electromagnetic means operative at such times only as the shuttle is in the proper position to receive a bobbin, substantially as described.

26. In a loom, a movable bobbin-magazine for automatically supplying bobbins to the shuttle, bobbins carried by said magazine, electromagnets operating to bring the bobbins of said magazine successively into the feeding position, an electric circuit passing through the coils of said magnets, and means for automatically completing the electric circuit when the weft-thread becomes broken whereby a filled bobbin is fed to said shuttle, substantially as described.

27. A loom, having a lay, shuttle, filling-fork, filling-fork slide and filling-fork hammer, in combination with a bobbin-magazine carrying a plurality of bobbins and adapted to automatically feed said bobbins to said shuttle, electromagnets operating said magazine, and means operated by the filling-fork, slide and hammer for completing the electric circuit to said magnet when the weft-thread becomes broken, substantially as described.

28. A loom having a lay, shuttle, filling-fork, filling-fork slide, and filling-fork hammer, in combination with a bobbin-magazine carrying a plurality of bobbins and adapted to automatically feed said bobbins to said shuttle, electromagnets operating said magazine, a rock-shaft operatively connected to the said filling-fork slide, electrical contacts in the circuit with said magnets and controlled by said rock-shaft, said shaft completing the circuit through said contacts when the weft-thread is broken or nearly exhausted, substantially as described.

29. In a loom having a lay, shuttle-box, shuttle, a bobbin-magazine carrying a plurality of bobbins and adapted to automatically feed the bobbins to the shuttle, electromagnets operating said magazine, a filling-fork, hammer and slide, a pivoted catch mounted on said slide and adapted to engage said hammer, an electromagnet operating said catch, means operated by the shuttle for completing the circuit to the catch-operating magnet whenever the filling of a bobbin is exhausted and means operatively connected to the said slide for completing the circuit to the magazine-magnets whereby a filled bobbin is fed to said shuttle, substantially as described.

30. A loom having a lay, shuttle-boxes, a shuttle, and a bobbin-magazine, bobbins carried thereby, said magazine adapted to automatically feed the bobbins to said shuttle, an electromagnet operating said magazine, in combination with a shuttle-controlled means for varying the electrical condition of the circuit of said magnet, comprising electrical contacts mounted in one of said shuttle-boxes, connected in the circuit with said electromagnet, the said circuit being completed through said contacts at such times only as the shuttle is in position to receive a filled bobbin, substantially as described.

31. A loom having a lay, and a shuttle carried thereby, a bobbin-magazine, a plurality of bobbins carried thereby, said magazine being adapted to automatically feed the said bobbins into said shuttle, electromagnets with means operated thereby for bringing the bobbins of said magazine into the feeding position, and means for operating said magnets to clear the said magazine of the lay after the exchange of bobbins has taken place, comprising electrical contacts located in the circuit of said electromagnet and adapted to be completed by said magazine when the bobbin is placed in the feeding position, substantially as described.

32. A loom having a lay, and a shuttle carried thereby, a bobbin-magazine, a plurality of bobbins carried thereby, said magazine being adapted to automatically feed the said bobbins into said shuttle, electromagnets with means operated thereby for bringing the bobbins of said magazine into the feeding position and means for operating said magnets to clear the said magazine of the lay after the exchange of bobbins has taken place comprising electrical contacts located in the circuit of said electromagnet and adapted to be completed by said magazine when the bobbin is placed in the feeding position, a second set of contacts in said circuit, and a shaft carrying a lug adapted to complete the circuit through said second contacts as the bobbin is brought into said feeding position, substantially as described.

33. In a loom, an electrically-operated bobbin-magazine carrying bobbins and adapted to automatically feed said bobbins to said magazine, an electric circuit operating said magazine and means for completing said circuit at such times as the filling of the bobbin in use becomes nearly exhausted said means comprising a bobbin having a metal contact-piece upon its head, a shuttle having springs which engage said contact-piece and a contact-piece carried by the shuttle and electrically connected to the shuttle-springs, a shuttle-box and electrical contacts carried thereby and adapted to engage the contact carried by the shuttle and a feeler located to make contact with the contact-piece of the bobbin at such times only as the filling becomes nearly exhausted, substantially as described.

34. In a loom, the combination with the lay and shuttle carried thereby, of an electromagnetically-operated filling-changing mechanism whereby the shuttle is driven into engagement with bobbins by the force of the lay, an electric circuit controlling said filling mechanism and means for changing the electrical condition of said circuit upon the exhaustion of a certain amount of filling from the bobbin, substantially as described.

35. In a loom, the combination with the lay and shuttle carried thereby, of an electromagnetically-operated filling-changing mechanism whereby the shuttle is driven into engagement with the bobbins by the force of the lay, an electric circuit controlling said filling mechanism and means for changing the electrical condition of said circuit upon the breaking of the weft-thread, substantially as described.

36. A loom having a lay, an automatically-threaded shuttle, a bobbin-magazine and bobbins carried thereby, means for operating said magazine whereby the shuttle is driven by the lay into engagement with a bobbin while the said bobbin is held by the magazine, the said bobbin being thus transferred from said magazine to said shuttle, substantially as described.

37. A loom having a lay, an automatically-threaded shuttle, a bobbin-magazine and bobbins carried thereby, electromagnetic means for operating said magazine whereby the shuttle is driven by the lay into engagement with the bobbin, the bobbin being thus transferred from the magazine to the shuttle, substantially as described.

38. A loom having a lay, a shuttle-box and shuttle, a bobbin-magazine and bobbins carried thereby, means for operating said magazine for bringing the bobbins into a predetermined feeding position, said position being such that the shuttle will be forced into engagement with the bobbin by the direct force of the lay, and means for automatically threading the shuttle with the filling thus transferred, substantially as described.

In testimony whereof we affix our signatures in presence of two witnesses.

WM. E. MOORE.
FRANK R. CLARK.

Witnesses:
SAM. F. GARLINGTON,
CLARENCE E. CLARK.